United States Patent
Masamura (10) Patent No.: US 7,822,519 B2
(45) Date of Patent: Oct. 26, 2010

(54) CONTROL DEVICE AND METHOD FOR SHOCK ABSORBER

(75) Inventor: Tatsuya Masamura, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 11/822,211

(22) Filed: Jul. 3, 2007

(65) Prior Publication Data

US 2008/0004771 A1      Jan. 3, 2008

(30) Foreign Application Priority Data

Jul. 3, 2006      (JP)      ............... 2006-183493

(51) Int. Cl.
    *B60G 23/00*      (2006.01)
(52) U.S. Cl. ......................... 701/37; 280/5.5
(58) Field of Classification Search .................. 701/37, 701/38
    See application file for complete search history.

(56) References Cited

U.S. PATENT DOCUMENTS

| | | | |
|---|---|---|---|
| 4,916,632 A * | 4/1990 | Doi et al. ................... | 700/280 |
| 5,377,107 A | 12/1994 | Shimizu et al. | |
| 5,382,045 A * | 1/1995 | Takeda et al. ............. | 280/5.515 |
| 5,559,700 A | 9/1996 | Majeed et al. | |
| 5,671,142 A * | 9/1997 | Tatarazako ................... | 701/37 |
| 5,983,150 A * | 11/1999 | Sasaki .......................... | 701/48 |
| 5,993,358 A * | 11/1999 | Gureghian et al. ............ | 482/54 |
| 6,314,353 B1 * | 11/2001 | Ohsaku et al. ............... | 701/37 |
| 2002/0183907 A1 * | 12/2002 | Stiller ......................... | 701/37 |
| 2003/0234508 A1 * | 12/2003 | Hanawa et al. .............. | 280/272 |

FOREIGN PATENT DOCUMENTS

| | | |
|---|---|---|
| EP | 0426340 A1 | 5/1991 |
| JP | 06-247117 | 9/1994 |

* cited by examiner

*Primary Examiner*—Mark Hellner
*Assistant Examiner*—Helal A Algahaim
(74) *Attorney, Agent, or Firm*—Rabin & Berdo, P.C.

(57) ABSTRACT

A damping force control device (1) for a shock absorber (Dn) interposed between a sprung member (Bn) and an unsprung member (Wn) of a vehicle (A) comprises a damping force varying mechanism (3) which supplements a minimum damping force (Fdn) that can be generated by the shock absorber (Dn) with a variable damping force (Fcn). The device (1) comprises a control portion (2) which calculates a deviation (εn) between a damping force target value (Fsn) and the minimum damping force (Fdn) (S207), and open-loop controls the damping force varying mechanism (3) using a variable damping force (Fcn) calculated on the basis of the deviation (εn) such that the damping force generated by the shock absorber (Dn) coincide with the damping force target value (Fsn) (S208-S212), thereby optimizing damping force control of the shock absorber (Dn), which has a non-linear damping characteristic.

13 Claims, 8 Drawing Sheets

G1, G2, G3 SPRUNG MEMBER ACCELERATION SENSOR
GU1, GU2, GU3, GU4 UNSPRUNG MEMBER ACCELERATION SENSOR

CONTROL DEVICE AND METHOD FOR SHOCK ABSORBER

FIELD OF THE INVENTION

This invention relates to the control of a shock absorber for a vehicle having a non-linear damping characteristic.

BACKGROUND OF THE INVENTION

JPH06-247117A, published by the Japan Patent Office in 1994, discloses the application of Sky Hook control to the damping force control of a shock absorber for a vehicle.

The control device according to this prior art calculates a damping coefficient C of the shock absorber by a relation C=Cs á V/Vs when the sign of a product of a sprung member speed V of a sprung member and a stroke speed Vs of the shock absorber is positive. In contrast, the control device calculates the damping coefficient C of the shock absorber by a relation C=Cs á V when the sign is negative. Herein, Cs denotes a Sky Hook damping coefficient.

In Sky Hook control, when the sign of the sprung member speed V and that of the stroke speed Vs of the shock absorber are identical, the Sky Hook control force is calculated by multiplying the sprung member speed V by the Sky Hook damping coefficient Cs. On the other hand, when the signs are different, control should be performed so as to cause the Sky Hook control force to become zero.

The prior art device adjusts the value of the damping coefficient C of the shock absorber such that the Sky Hook control force Cs á V, which is required when the signs of the sprung member speed V and the stroke speed Vs of the shock absorber are identical, becomes equal to a value Vs á C, which is a damping force of the shock absorber obtained as a product of the stroke speed Vs of the shock absorber and the damping coefficient C.

SUMMARY OF THE INVENTION

However, when adjusting the damping coefficient C according to the prior art, it may be impossible to control the damping force of a shock absorber as intended.

Figure 10:
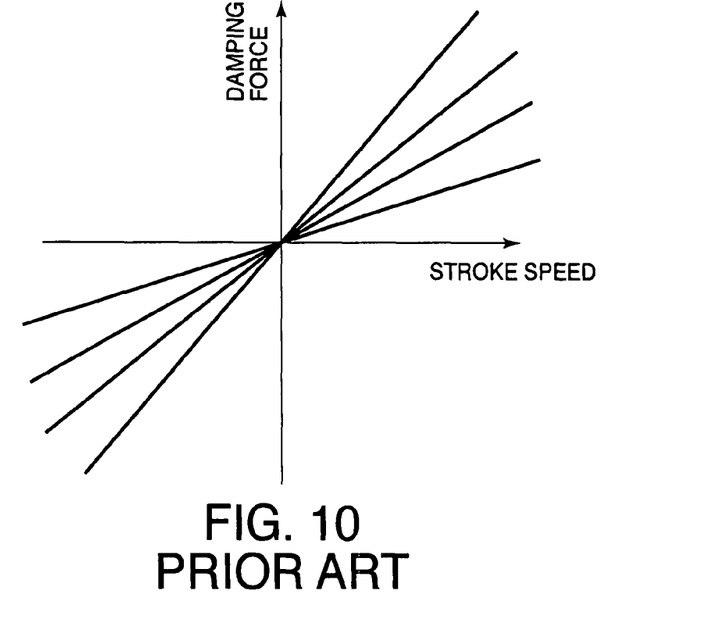
FIG. 10 is a diagram showing a damping characteristic of a shock absorber according to a prior art example.

Referring to FIG. 10, when the characteristic of a generated damping force with respect to a stroke speed of a shock absorber (hereinafter referred to as the damping characteristic of the shock absorber) maintains a linear feature, the damping force of the shock absorber is controlled optimally by adjusting the damping coefficient C.

Figure 11:
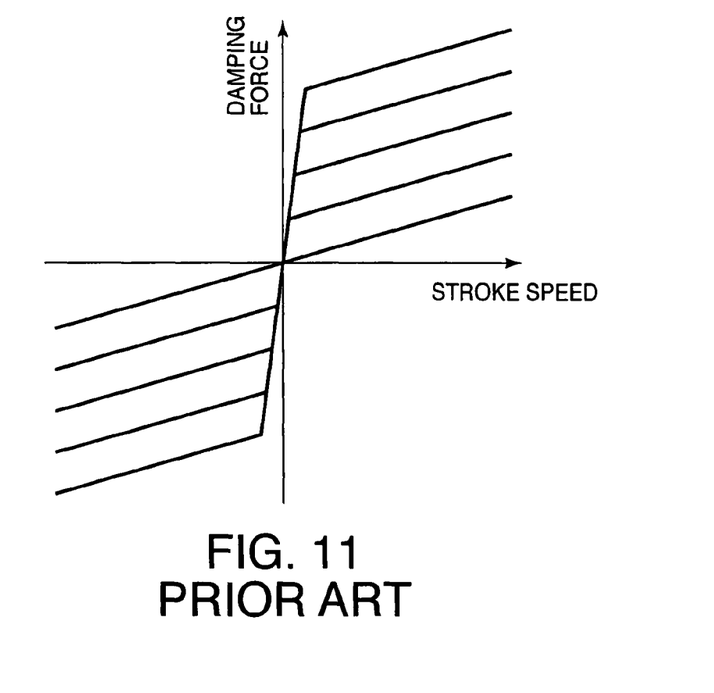
FIG. 11 is a diagram showing a damping characteristic of a shock absorber according to another prior art example.

Referring to FIG. 11, in a shock absorber in which damping force is regulated by adjusting a cracking pressure of a damping valve, or in a shock absorber in which the damping characteristic is shifted in parallel using electrorheological fluid or magnetorheological fluid, the damping characteristic may have a non-linear feature. In a shock absorber having such a damping characteristic, it is difficult to regulate the damping force by simply altering the damping coefficient C obtained by the above method. In other words, when the line indicative of the damping characteristic is linear and passes through the origin at which the stroke speed axis and the damping force axis intersect, the shock absorber can be caused to generate a preferable damping force by simply altering the damping coefficient C, but in a shock absorber having a non-linear damping characteristic as shown in FIG. 11, since the gradient of the damping characteristic line varies along its course, it may be impossible to cause the shock absorber to generate a preferable damping force by simply altering the damping coefficient C.

Further, if the damping force generated by the shock absorber varied completely in proportion to the stroke speed of the shock absorber, regulation of the damping force depending on the adjustment of the damping coefficient C would be effective, but it is difficult to realize such a damping characteristic in a shock absorber, and hence a deviation may arise between the actual damping force and a damping force calculated by Sky Hook control, which may adversely affect the traveling comfort of the vehicle.

Still further, the prior art divides the Sky Hook control force Cs á V by the stroke speed Vs to calculate the damping coefficient C. When the stroke speed Vs takes a value around zero, the damping coefficient C takes a very large value and the calculation error inevitably increases.

In a running region where the stroke speed Vs is around zero, it is difficult to control the damping force with precision, and hence a stable damping force may not be generated due to a phenomenon known as hunting.

It is therefore an object of this invention to optimize damping force control of a shock absorber which has a non-linear damping characteristic.

In order to achieve the above object, this invention provides a damping force control device for controlling a damping force generated by a shock absorber interposed between a sprung member and an unsprung member of a vehicle. The device comprises a damping force varying mechanism which supplements a minimum damping force that can be generated by the shock absorber with a variable damping force, and a control portion functioning to calculate a deviation between a damping force target value and the minimum damping force; and open-loop control the damping force varying mechanism according to the deviation such that the damping force generated by the shock absorber coincides with the damping force target value.

This invention also provides a damping force control method for a shock absorber provided with the damping force varying mechanism as described above. The method comprises calculating a deviation between a damping force target value and the minimum damping force, and open-loop controlling the damping force varying mechanism according to the deviation such that the damping force generated by the shock absorber coincides with the damping force target value.

The details as well as other features and advantages of this invention are set forth in the remainder of the specification and are shown in the accompanying drawings.

DESCRIPTION OF THE PREFERRED EMBODIMENTS

Figure 1:
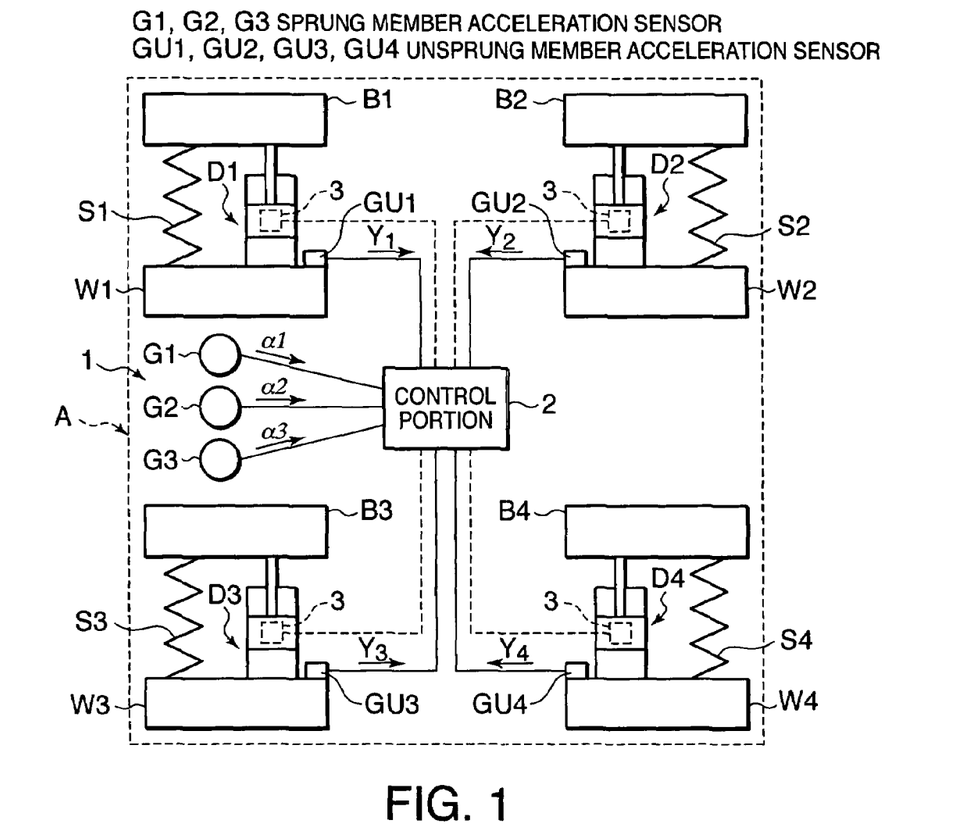
FIG. 1 is a schematic diagram of a control device for a shock absorber according to this invention.

Referring to FIG. 1 of the drawings, a vehicle A comprises four wheels supported respectively by a vehicle body via four suspension springs S1-S4 and four shock absorbers D1-D4. From a mechanical viewpoint, the wheels correspond to unsprung members W1-W4 of the suspension springs S1-S4. Also, the vehicle corresponds to sprung members B1-B4 of the suspension springs S1-S4. The sum of the weight of the sprung members B1-B4 is equal to the weight of the vehicle.

A control device 1 of the shock absorbers D1-D4 comprises a control portion 2 installed in an arbitrary position in the vehicle body, three sprung member acceleration sensors G1-G3 which detect an acceleration in a vertical direction of various parts of the vehicle body, unsprung member acceleration sensors GU1-GU4 which detect an unsprung member acceleration Y1-Y4 of the unsprung members W1-W4 in a vertical direction, respectively, and damping force varying mechanisms 3 which vary a damping force generated by the shock absorbers D1-D4, respectively.

The shock absorber D1 is interposed between the sprung member B1 and the unsprung member W1 in parallel with the suspension spring S1. The shock absorber D2 is interposed between the sprung member B2 and the unsprung member W2 in parallel with the suspension spring S2. The shock absorber D3 is interposed between the sprung member B3 and the unsprung member W3 in parallel with the suspension spring S3. The shock absorber D4 is interposed between the sprung member B4 and the unsprung member W4 in parallel with the suspension spring S4.

Figure 2:
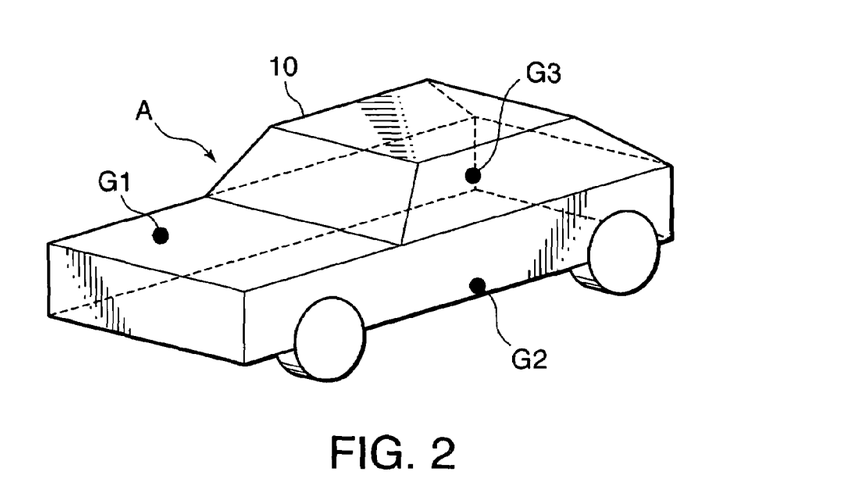
FIG. 2 is a schematic perspective view of a vehicle indicating the location of sprung member acceleration sensors according to this invention.

Referring to FIG. 2, the sprung member acceleration sensors G1-G3 are sensors that detect acceleration of the vehicle body 10 in a vertical direction, and are disposed in three arbitrary positions in the vehicle body 10 that are not aligned on a front-aft line or a lateral line of the vehicle.

The sprung member acceleration sensors G1-G3 output voltage signals corresponding to detected acceleration $\alpha 1$-$\alpha 3$ to the control portion 2 of the control device 1 of the shock absorbers D1-D4. On the basis of these voltage signals, the control portion 2 calculates an acceleration $\alpha 1$-$\alpha 3$ of each of the sprung members B1-B4 in a vertical direction. In the following description, an upward acceleration is represented by a positive value. Likewise, an upward acceleration of the unsprung members as well as upward damping forces generated by the shock absorbers D1-D4 are represented by positive values.

An acceleration Xn of a sprung member Bn is explained by the following equation (1).

$$Xn = \beta n1 \dot{a}\alpha 1 + \beta n2 \dot{a}\alpha 2 + \beta n3 \dot{a}\alpha 3$$

where n=an index chosen from the numbers of one to four for identifying four sprung members. For example, when n=1 in the equation (1), the acceleration X1 of the sprung member B1 is calculated, and $\beta n1$, $\beta n2$, $\beta n3$=constants determined according to the location of the sprung member acceleration sensors G1-G3, a position of the center of gravity of the vehicle body 10, a distance between the center of gravity of the vehicle body 10 and each of the sprung members B1-B4, a wheelbase of the vehicle A, a tread of the vehicle A, and so on.

The equation (1) denotes that, providing that the vehicle body 10 is a rigid body, an acceleration X1-X4 of the sprung members B1-B4 can be determined unambiguously by obtaining a vertical acceleration $\alpha 1$-$\alpha 3$ of three parts of the vehicle body 10 which are arbitrarily determined but not aligned on a front-aft line or a lateral line of the vehicle.

Referring again to FIG. 1, the unsprung member acceleration sensors GU1-GU4 detect the unsprung member acceleration Y1-Y4 of the unsprung members W1-W4 in a vertical direction and output corresponding signals to the control portion 2, respectively.

Each of the damping force varying mechanisms 3, which varies the damping force generated by the shock absorbers D1-D4 comprises a mechanism that varies a cracking pressure of a damping valve with which the shock absorber D1-D4 is provided. The cracking pressure corresponds to a minimum pressure for opening a valve.

Figure 3:
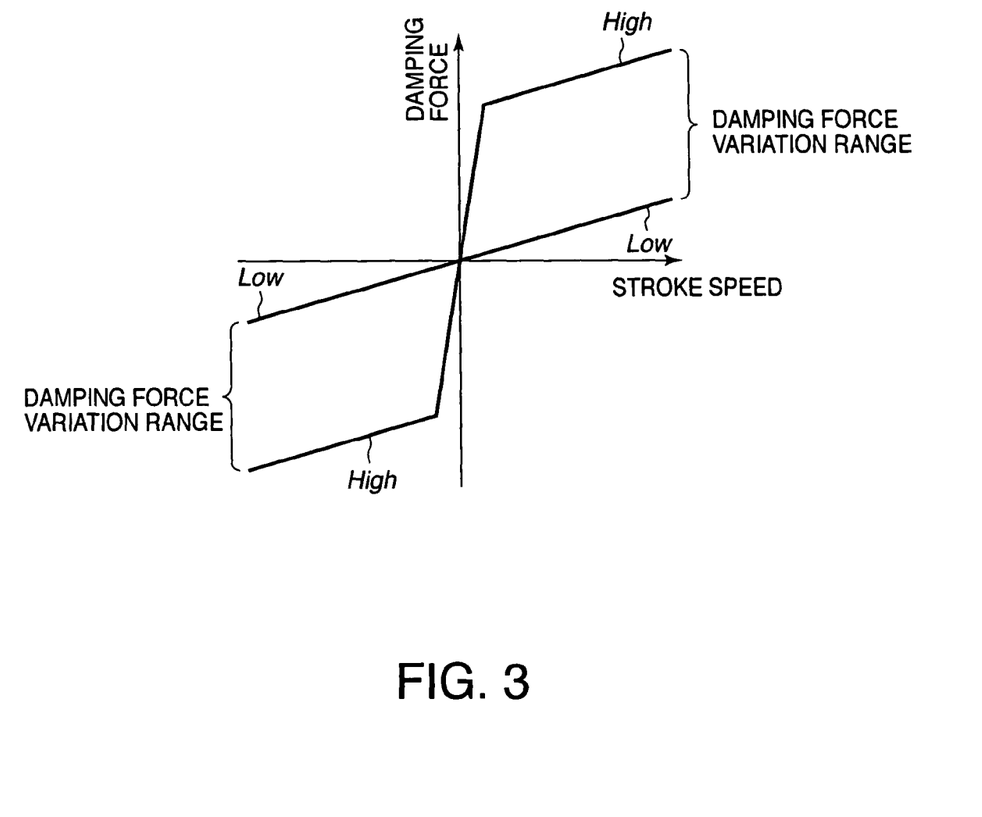
FIG. 3 is a diagram showing a damping characteristic of the shock absorber.

Referring to FIG. 3, when the cracking pressure is varied, the damping characteristic of the shock absorber D1-D4 performs a parallel shift along the ordinate in the figure within a range between a minimum damping characteristic Low and a maximum damping characteristic High. The damping force varying mechanisms 3 vary the damping force generated by the shock absorber Dn when the shock absorber Dn elongates and contracts, within this range.

The shock absorbers D1-D4 are constructed to have a common structure.

Figure 4:
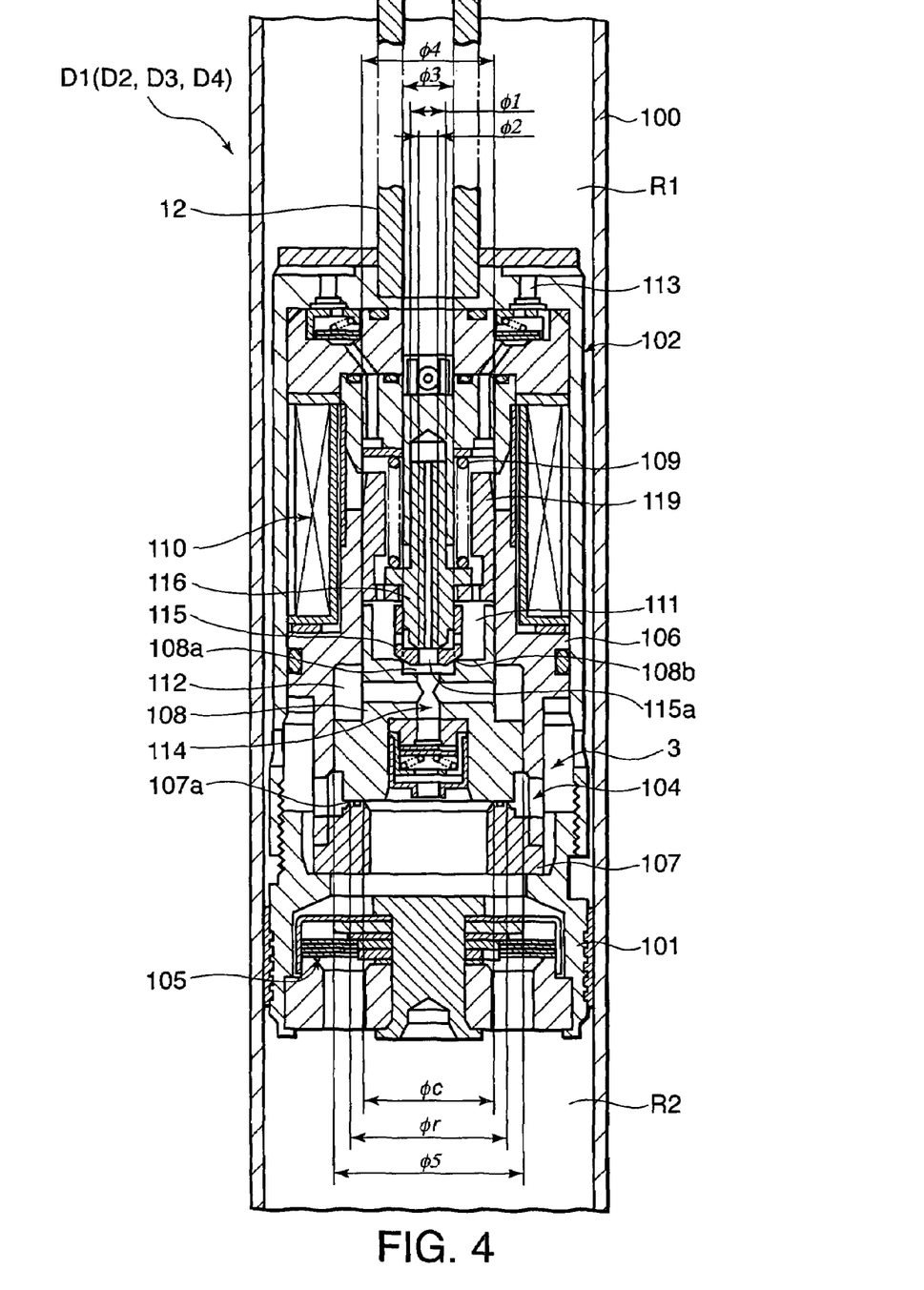
FIG. 4 is a longitudinal sectional view of a damping force varying mechanism installed in the shock absorber.

Referring to FIG. 4, each of the shock absorbers D1-D4 comprises a cylinder 100, a hollow cylindrical piston 101 sliding within the cylinder 100, and a hollow piston rod 12 fixed to the piston 101 via the damping force varying mechanism 3 and projecting axially outward from the cylinder 100.

The interior of the cylinder 100 is divided by the piston 101 into a rod side chamber R1 and a piston side chamber R2. The rod side chamber R1 and the piston side chamber R2 communicate with each other via a main passage 104 formed through the piston 101 and the damping force varying mechanism 3. A relief valve 105 is installed in the interior of the piston 101 facing the main passage 104. The damping force varying mechanism 3 is disposed in the main passage 104 in series with the relief valve 105.

Figure 5:
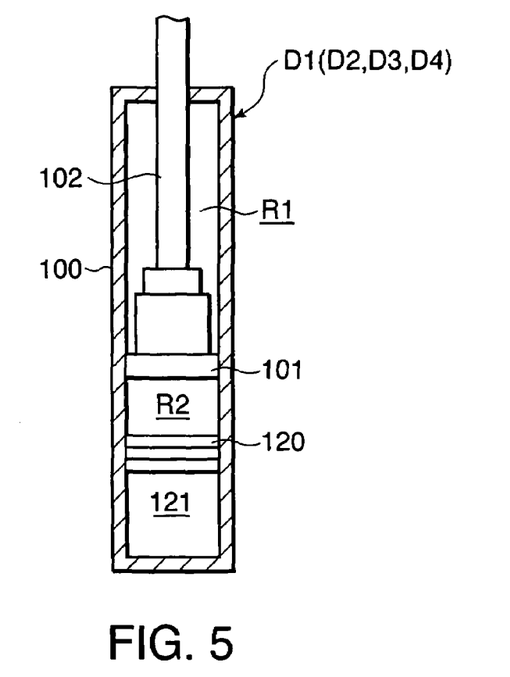
FIG. 5 is a schematic longitudinal sectional view of the shock absorber.

Referring to FIG. 5, a fluid such as hydraulic oil is enclosed in the cylinder 100. A gas chamber 121 is formed in the cylinder 100 by a free piston 120 disposed beneath the piston 101. The gas chamber 121 is filled with a high pressure gas to compensate for a capacity variation in the cylinder 100 which is caused by the piston rod 12 penetrating into and projecting from the cylinder 100 as the shock absorber D1-D4 elongates and contracts, by moving the free piston 120 vertically in the cylinder 100. The shock absorber D1-D4 is constructed as a so-called single-shell type. The shock absorber D1-D4 may however be constructed as a double-shell type.

Referring again to FIG. 4, the damping force varying mechanism 3 comprises a cylindrical housing 102 of which an upper end is fixed to the piston rod 12 and a lower end is fixed to the piston 101. The damping force varying mechanism 3 further comprises a sleeve 106 fixed in the interior of the housing 102, a spool 108 which slides in the sleeve 106, and a valve seat member 107 gripped between the spool 108 and the piston 101. The piston 101 is screwed into the lower end of the housing 102. The valve seat member 107 comprises an annular valve seat 107a which has double circular seat portions in contact with the lower end of the spool 108.

On the rear side of the spool 108, or above the spool 108 in FIG. 4, a spring 109 which pushes the spool 108 towards the valve seat member 107 and a solenoid 110 which applies an upward thrust force on the spool 108 to decrease the pushing force of the spring 109 in response to an energizing current are enclosed in the housing 102.

An elongation pilot chamber 111 facing the rear face of the spool 108 is formed in the housing 102. A contraction pilot chamber 112 is also formed in the housing 102 between a step which is formed on the outer circumference of the spool 108 and the inner circumference of the sleeve 106.

A pressure in the rod side chamber R1 is led to the elongation pilot chamber 111 via an elongation pilot passage 113 formed in the housing 102. A pressure in the piston side chamber R2 is led to the contraction pilot chamber 112 via a contraction pilot passage 114 formed through the spool 108.

The contraction pilot chamber 112 and the elongation pilot chamber 111 communicate with each other via a through-hole 108a formed on the rear side of the spool 108 and the contraction pilot passage 114. An annular valve seat 108b is formed around the through-hole 108a and a cylindrical first sub-valve 115 having a bottom and pushed by the spring 109 is seated on the annular valve seat 108b from above to close the through-hole 108a while exerting a thrust force on the spool 108 towards the valve seat member 107.

A through-hole 115a is formed at the bottom of the first sub-valve 115. The through-hole 115a is closed by a cylindrical second sub-valve 116 pushed by the spring 109 from above.

The second sub-valve 116 is engaged with an armature 119. The solenoid 110 applies an upward force on the armature 119 depending on the energizing current to decrease the spring force which the spring 109 exerts on the second sub-valve 116. As a result, the cracking pressure of the first sub-valve 115 and the cracking pressure of the second sub-valve 116 decrease. Simultaneously, the cracking pressure between the spool 108 which opens and closes the main passage 104 and the annular valve seat 107a decreases.

Referring to FIG. 3, the damping force generated by the shock absorber D1-D4 varies within a range between the minimum damping characteristic Low to the maximum damping characteristic High in an increasing direction when the solenoid 110 decreases the spring force which the spring 109 exerts on the second sub-valve 116 depending on the energizing current. Herein, the maximum damping characteristic High corresponds to a case where the solenoid 110 is supplied with no energizing current, and the minimum damping characteristic Low corresponds to a case where the solenoid 110 is supplied with a maximum energizing current. As the energizing current decreases, the damping force characteristic performs a parallel shift along the ordinate while a gradient thereof remains unchanged. The parallel shift is performed in such a manner that, when the characteristic shown in the first quadrant of the diagram moves upward, the characteristic shown in the third quadrant moves simultaneously downward, and vice versa.

Referring again to FIG. 4, the dimensions of various parts of the damping force varying mechanism 3 are set as follows.

Specifically, assuming that:

φ=diameter of upper small diameter part of second sub-valve 116;

φ=diameter of valve seat of through-hole 115a;

φ=diameter of valve seat of through-hole 108a;

φ=inner diameter of sleeve 106;

φc=inner diameter of annular valve seat 107a;

φr=outer diameter of annular valve seat 107a; and

φ5=outer diameter of spool 108;

the dimensions of various parts of the damping force varying mechanism 3 are set to satisfy the following relations:

$$\phi 4^2-\phi 2^2 > \phi 5^2-\phi r^2 \text{ and } \phi 5^2-\phi 4^2 > \phi c^2-3^2.$$

The cracking pressure of the second sub-valve 116 is assumed to be Pc2 and the pressure in the rod side chamber R1 is assumed to be Pa when the shock absorber D1-D4 elongates or when the piston 101 moves upward in FIG. 4, In a state where the relation Pc2 á ($\phi 4^2-\phi 2^2$)>Pa á ($\phi 5^2-\phi r^2$) holds, the spool 108 does not lift from the annular valve seat 107a and the main passage 104 is closed. When the relation Pc2 á ($\phi 4^2-\phi 2^2$)<Pa á ($\phi 5^2-\phi r^2$) holds, the spool 108 lifts from the annular valve seat 107a so that the main passage 104 opens. The cracking pressure Pc2 is a pressure which causes the second sub-valve 116 to lift from the through-hole 115a of the first sub-valve 115 such that the elongation pilot chamber 111 communicates with the contraction pilot passage 114. This cracking pressure Pc2 is adjustable by decreasing the spring force of the spring 109 by increasing the upward thrust force generated by the solenoid 110. By thus adjusting the upward thrust force by the solenoid 110, in the elongation stroke of the shock absorber D1-D4, the cracking pressure at which the spool 108 opens the main passage 104 also varies.

The cracking pressure of the first sub-valve 115 is assumed to be Pc1 and the pressure in the piston side chamber R2 is assumed to be Pb when the shock absorber D1-D4 contracts or when the piston 101 moves downward in FIG. 4, In a state where the relation Pc1 á ($\phi 5^2-\phi 4^2$)>Pb á ($\phi c^2-\phi 3^2$) holds, the spool 108 does not lift from the annular valve seat 107a and the main passage 104 is closed. When the relation Pc1 á ($\phi 5^2-\phi 4^2$)<Pb á ($\phi c^2-\phi 3^2$) holds, the spool 108 lifts from the annular valve seat 107a so that the main passage 104 opens. The cracking pressure Pc1 is a pressure which causes the first sub-valve 115 to lift from the through-hole 108a of the spool 108 such that the elongation pilot chamber 111 communicates with the contraction pilot passage 114. This cracking pressure Pc1 is adjustable by decreasing the spring force of the spring 109 by increasing the upward thrust force generated by the solenoid 110. By thus adjusting the upward thrust force generated by the solenoid 110, in the contraction stroke of the shock absorber D1-D4, the cracking pressure at which the spool 108 opens the main passage 104 also varies.

In both the elongation stroke and the contraction stroke of the shock absorber D1-D4, the cracking pressure at which the spool 108 opens the main passage 104 can be varied using a single solenoid 110. The damping force varying mechanism 3 thereby varies the damping characteristic of the shock absorber D1-D4 within the range shown in FIG. 3.

As described above, as the energizing current of the solenoid 110 increases, the cracking pressures Pc1 and Pc2 decreases. In other words, when an energizing current supply to the solenoid 110 is accidentally shut off, the shock absorber D1-D4 generates the maximum damping force, which ensures a fail-safe operation of a vehicle suspension system.

The construction of the shock absorbers D1-D4 is an example and this invention is not limited by the type of shock absorbers. For example, the damping valve may be constituted by a valve seat formed in the fluid passage and a poppet valve seated thereon. The damping force varying mechanism may be constituted by a solenoid which exerts a thrust force on the valve in a direction to lift from the valve seat and a spring which pushes the valve in the opposite direction. In this case the thrust force of the solenoid adjusts the spring force exerted on the valve such that the cracking pressure at which the valve lifts off the valve seat can be varied.

As described above, the damping force varying mechanism 3 alters the cracking pressure of the damping valve installed in the shock absorber D1-D4, Referring to FIG. 6, a different construction of the damping force varying mechanism will be described.

In a shock absorber which employs electrorheological fluid or magnetorheological fluid as working fluid, a device 201 which generates an electric field in the electrorheological fluid or a magnetic field in the magnetorheological fluid to vary the viscosity of the fluid may be installed in a passage 200 connecting the rod side chamber R3 and the piston side chamber R4 as a damping force varying mechanism. The passage 200 is formed in a gap between the piston 202 and the cylinder 203, but the location of the passage 200 is not limited to this configuration. In a shock absorber employing electrorheological fluid, the device 201 comprises electric poles disposed on the outer circumference of the piston 202 and an energizing current supply mechanism supplying the electric poles with an energizing current. In a shock absorber employing magnetorheological fluid, the device 201 comprises a coil disposed in the piston 202 and an energizing current supply mechanism supplying the coil with energizing current. In any of the above cases, the variable damping characteristic shown in FIG. 3 can be achieved.

Next, the control portion 2 will be described. The control portion 2 processes the signals output from the sprung member acceleration sensors G1-G3 and the unsprung member acceleration sensors GU1-GU4, and calculates a damping force target value Fsn to be generated by the shock absorber D1-D4. The damping force target value Fsn corresponds to the aforesaid Sky Hook control force. The control portion 2 outputs a command in the form of a current or voltage signal to realize the damping force target value Fsn to the solenoid 110 in each of the shock absorber D1-D4. The control portion 2 calculates a variable damping force Fc1-Fc4 to be added to a minimum damping force Fd1-Fd4 of the respective shock absorbers D1-D4 on the basis of a stroke speed Vs1-Vs4 of the shock absorbers Dn and the sprung member acceleration V1-V4 of the sprung members B1-B4, to perform Sky Hook control of the damping force of the shock absorbers Dn.

Figure 7:
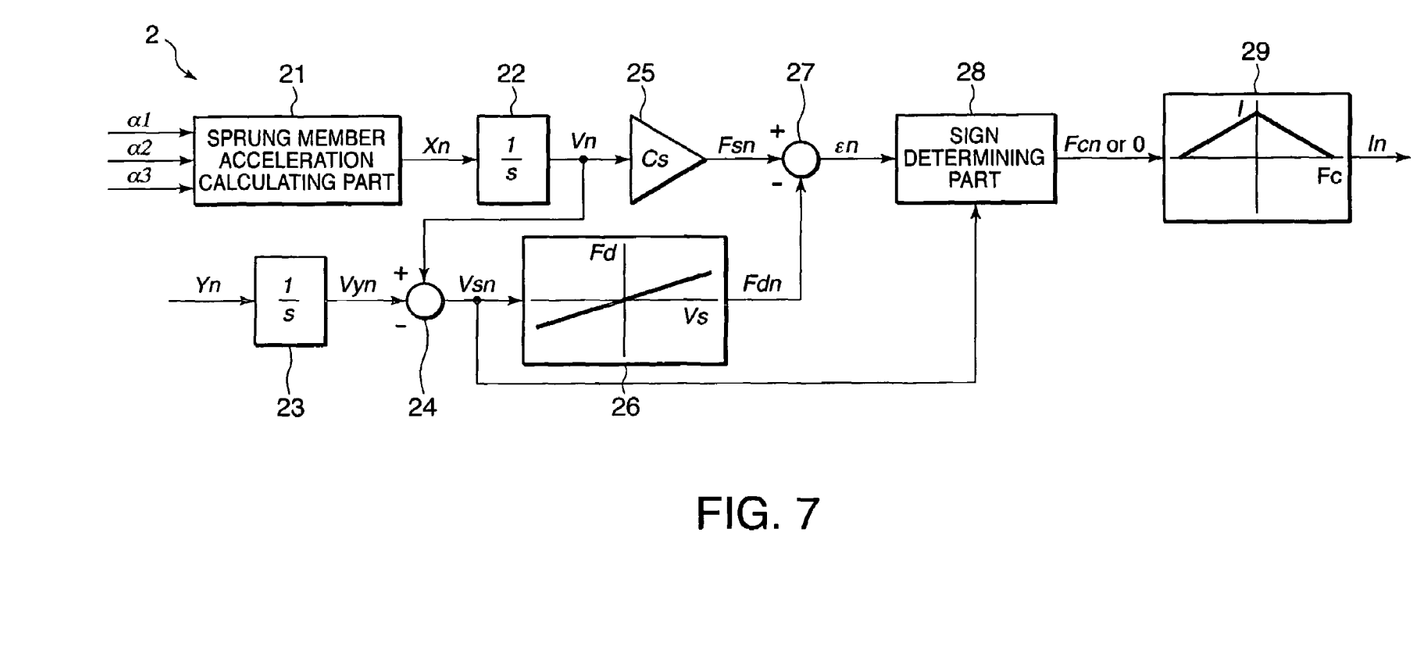
FIG. 7 is a block diagram of a control portion of the control device according to this invention.

Referring to FIG. 7, the control portion 2 comprises a sprung member acceleration calculating part 21, an integrator 22, an integrator 23, an adder 24, a multiplier 25, a minimum damping force calculating part 26, an adder 27, a sign determining part 28, and a current conversion part 29.

The sprung member acceleration calculating part 21 calculates the sprung member acceleration Xn from the acceleration α1, α2, α3 detected by the sprung member acceleration sensors G1, G2, G3, respectively.

The integrator 22 calculates an integral of the sprung member acceleration Xn and obtains a sprung member speed Vn of each sprung member Bn in a vertical direction.

The integrator 23 calculates an integral of the unsprung member acceleration Yn detected by the unsprung member acceleration sensors GUn to calculate an unsprung member speed Vyn of the unsprung members W1-W4 in a vertical direction.

The adder 24 calculates the stroke speed Vsn of each of the shock absorbers Dn by subtracting the unsprung member speed Vyn from the sprung member speed Vn.

The multiplier 25 multiplies the sprung member speed Vn by a Sky Hook damping coefficient Cs to calculate the damping force target value Fsn.

The minimum damping force calculating part 26 calculates the minimum damping force Fdn that the shock absorbers Dn can generate at the stroke speed Vsn.

The adder 27 calculates a deviation εn by subtracting the minimum damping force Fdn from the damping force target value Fsn.

The sign determining part 28 determines the sign of the product of the deviation εn and the stroke speed Vsn. When the sign is positive, the sign determining part 28 outputs the deviation εn as the variable damping force Fcn to be added to the minimum damping force Fdn of the shock absorbers Dn. On the other hand, when the sign is negative, the sign determining part 28 outputs zero as the variable damping force Fcn.

The current conversion part 29 converts the variable damping force Fcn output from the sign determining part 28 into a current command value In that is output to a drive circuit of the solenoid 110. It should be noted that n in the above signs is an index chosen from the numbers one to four for identifying the four sprung members and the four unsprung members, respectively.

The action of each part of the control portion 2 will now be described in detail. The sprung member acceleration part 21 performs the calculation described above to obtain the sprung member acceleration Xn when the values of the acceleration α1, α2, α3 are input from the sprung member acceleration sensor G1, G2, G3. The integrator 22 then calculates the sprung member speed Vn of each sprung member Bn in a vertical direction from the sprung member acceleration Xn.

On the other hand, the integrator 23 calculates an integral of the unsprung member acceleration Yn detected by the unsprung member acceleration sensors GUn to obtain the unsprung member speed Vyn of each of the unsprung members Wn. The unsprung member speed Vyn calculated by the integrator 23 and the sprung member speed Vn calculated by the integrator 22 are input into the adder 24. The adder 24 calculates the stroke speed Vsn of each of the shock absorbers Dn.

The sprung member speed Vn output from the integrator 22 is also input into the multiplier 25. The multiplier 25 multiplies the sprung member speed Vn by the Sky Hook damping coefficient Cs to calculate the damping force target value Fsn.

Figure 8:
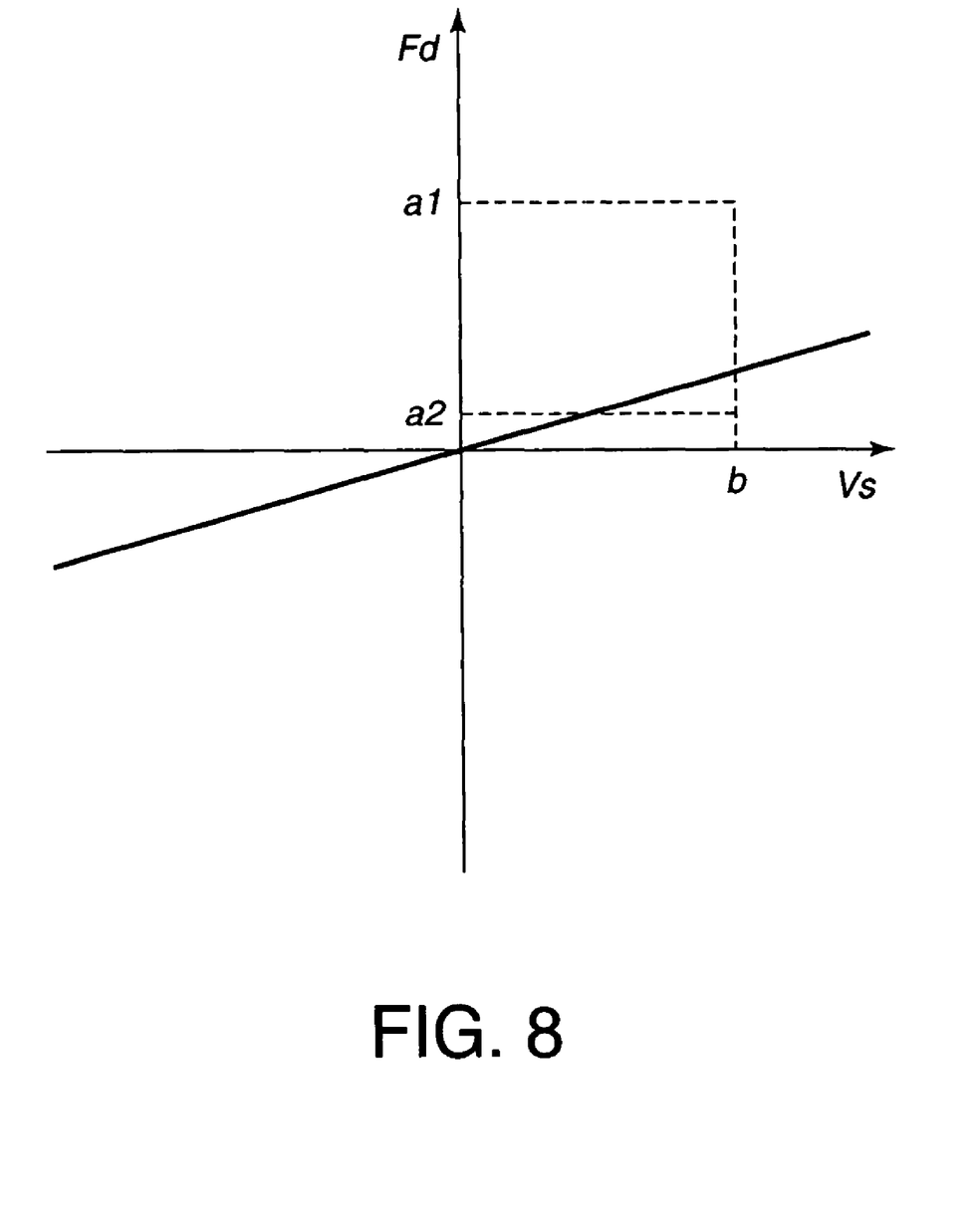
FIG. 8 is a diagram showing a characteristic of a minimum damping force map stored by the control portion.

The minimum damping force calculating part 26 refers to a map of the minimum damping force Fdn having the characteristic shown in FIG. 8 and defining the minimum damping force Fdn using the stroke speed Vsn as a parameter. The relationship between the stroke speed Vsn and the minimum damping force Fdn shown in this diagram corresponds to the minimum damping characteristic Low in FIG. 3.

The minimum damping force Fdn may be calculated without using a map by multiplying the stroke speed Vsn by a constant which approximates the damping characteristic of the shock absorbers Dn.

The adder 27 subtracts the minimum damping force Fdn from the damping force target value Fsn to calculate the deviation εn. The deviation εn takes a positive value when, for example, the damping force target value Fsn is at a1 and the stroke speed is at b in FIG. 8. In this case, the deviation εn is equal to the variable damping force Fcn to be generated by the damping force varying mechanism 3.

In contrast, when the damping force target value Fsn is at a2 and the stroke speed is at b in FIG. 8, the deviation εn takes a negative value. In this state, the minimum damping force Fdn exceeds the damping force target value Fsn, and hence the shock absorber Dn cannot generate a damping force equal to the damping force target value Fsn.

In Sky Hook control of the shock absorbers Dn, when the direction of the sprung member speed Vn and that of the stroke speed Vsn are not the same, or in other words when the sign of the product of the sprung member speed Vn and the stroke speed Vsn is negative, it is preferable to set the damping force target value Fsn to zero. The shock absorber Dn however cannot generate a damping force corresponding to a region surrounded by the line of the minimum damping characteristic Low and the axis of the stroke speed in FIG. 3. Accordingly, if the deviation takes a negative value even when the sign of the product of the sprung member speed Vn and the stroke speed Vsn is positive, or if the sign of the product of the sprung member speed Vn and the stroke speed Vsn is negative, the damping force generated by the shock absorbers Dn should be kept as small as possible.

The sign determining part 28 determines the sign of the product of the deviation $\epsilon n$ and the stroke speed Vsn. When this sign is positive, it means that the product of the sprung member speed Vn and the stroke speed Vsn takes a positive value and the damping force Fsn is greater than the minimum damping force Fdn. In this state, the deviation $\epsilon n$ is equal to the variable damping force Fcn to be generated by the damping force varying mechanism 3, and hence the sign determining part 28 outputs the deviation $\epsilon n$ as the variable damping force Fcn.

In contrast, when the sign of the product of the deviation $\epsilon n$ and the stroke speed Vsn is negative, the sign determining part 28 determines that the situation corresponds to either a case where the deviation $\epsilon n$ is negative while the product of the sprung member speed Vn and the stroke speed Vsn takes a positive value, or a case where the product of the sprung member speed Vn and the stroke speed Vsn takes a negative value. In this case, the sign determining part 28 outputs zero as the damping force target value Fsn.

The sign determining part 28 thus determines whether or not the product of the deviation $\epsilon n$ and the stroke speed Vsn is positive and outputs the deviation $\epsilon n$ or zero as the damping force target value Fsn, according to the determination result. It is therefore not necessary to perform two kinds of determination, i.e., to determine the product of the sprung member speed Vn and the stroke speed Vsn to determine the sign of the deviation $\epsilon n$. This determining algorithm therefore shortens the time required for the determination and improves the response of the damping force control.

Finally, the current conversion part 29 converts the variable damping force Fsn into a corresponding current command value In and outputs the current command value In to the drive circuit of the solenoid 110.

The resultant characteristic of the damping force as a result of supplementing the minimum damping force of the shock absorber Dn with the variable damping force corresponds to the minimum damping characteristic Low shifted in parallel along the vertical axis in FIG. 3. The current command value In output from the current conversion part 29 is proportional to the variable damping force Fcn. By supplying an electric current to the solenoid 110 as specified by the current command value In, therefore, the damping force finally generated by the shock absorber Dn corresponds to the damping force target value Fsn in a state where the directions of the sprung member speed Vsn and the stroke speed Vsn are identical and the damping force target value Fsn is greater than the minimum damping force Fdn. In a state where the directions of the sprung member speed Vsn and the stroke speed Vsn are different or the damping force target value Fsn is smaller than the minimum damping force Fdn even though the directions of the sprung member speed Vsn and the stroke speed Vsn are identical, the damping force finally generated by the shock absorber Dn becomes equal to the minimum damping force Fdn.

According to this embodiment, the damping force generated by the shock absorber Dn reaches a maximum when no electric current is supplied to the solenoid 110, and reaches a minimum when the maximum electric current is supplied to the solenoid 110. In other words, the current command value In takes a maximum value when the variable damping force Fcn is zero and decreases towards zero as the variable damping force Fcn increases.

The control device 1 controls the variable damping force Fcn on the basis of the deviation $\epsilon n$ between the damping force target value Fsn of the shock absorber Dn and the minimum damping force Fdn which the shock absorber can generate without adjusting the damping coefficient, in order to control the damping characteristic of a shock absorber having a non-linear damping characteristic.

Accordingly, open-loop control of the damping force can be performed without performing complicated processing, and hence damping force control of a shock absorber having a non-linear damping characteristic to the damping force target value Fsn can be performed with a high response.

In this embodiment, when the stroke speed Vsn of the shock absorber Dn varies, the damping force generated by the shock absorber Dn does not vary and the shock absorber Dn constantly generates a damping force corresponding to the damping force target value Fsn. The shock absorber Dn therefore has an excellent oscillation insulation effect, i.e., preventing oscillation input from the running surface when the vehicle A is travelling from being transmitted to the vehicle body 10, and hence improves the riding comfort of the vehicle A significantly.

Further, according to this control device 1, it is not necessary to divide the Sky Hook control force Cs á V, or in other words the damping force target value, by the stroke speed Vsn as in the case of the prior art, and hence the calculation error does not increase even in a case where the stroke speed Vsn is in the vicinity of zero. The shock absorber Dn therefore generates a stable damping force in an operation region where the stroke speed Vsn is in the vicinity of zero.

In the above embodiment, Sky Hook control is described as an example of control by the control device 1, but the control device 1 of the shock absorber according to this invention, has a control principle of controlling a damping force according to a deviation $\epsilon n$ between the damping force target value Fsn and the minimum damping force Fdn that can be generated by the shock absorber Dn. The method for determining the damping force target value is not limited to the Sky Hook control method, and any other method may be applied. For example, a control method applied for calculating an optimum damping force for roll control of the vehicle or pitch or squat control of the vehicle during braking may be used to calculate of the damping force target value Fsn. The damping force target value Fsn can be determined according to any appropriate control method.

The control portion 2 may be constituted by a microcomputer comprising an amplifier for amplifying the signals output from the sprung member acceleration sensors G1-G3 and the unsprung member acceleration sensors GU1-GU4, an analog-to-digital converter for converting an analog signal into a digital signal, a central processing unit (CPU), a read-only memory (ROM), a random access memory (RAM), an input/output interface (I/O interface), a crystal oscillator, and a bus line connecting these devices. The control process for processing the signals, calculating the variable damping force, and controlling the solenoid 110 in each of the damping force varying mechanisms 3 based on the calculation result is specified in a program and stored in the ROM or another storage device in advance.

The control portion 2 may be constituted by a plurality of microcomputers. When the vehicle A is provided with an Electronic Control Unit (ECU), the control portion 2 may be integrated into the ECU without providing the control portion 2 in the form of an independent unit.

Figure 9:
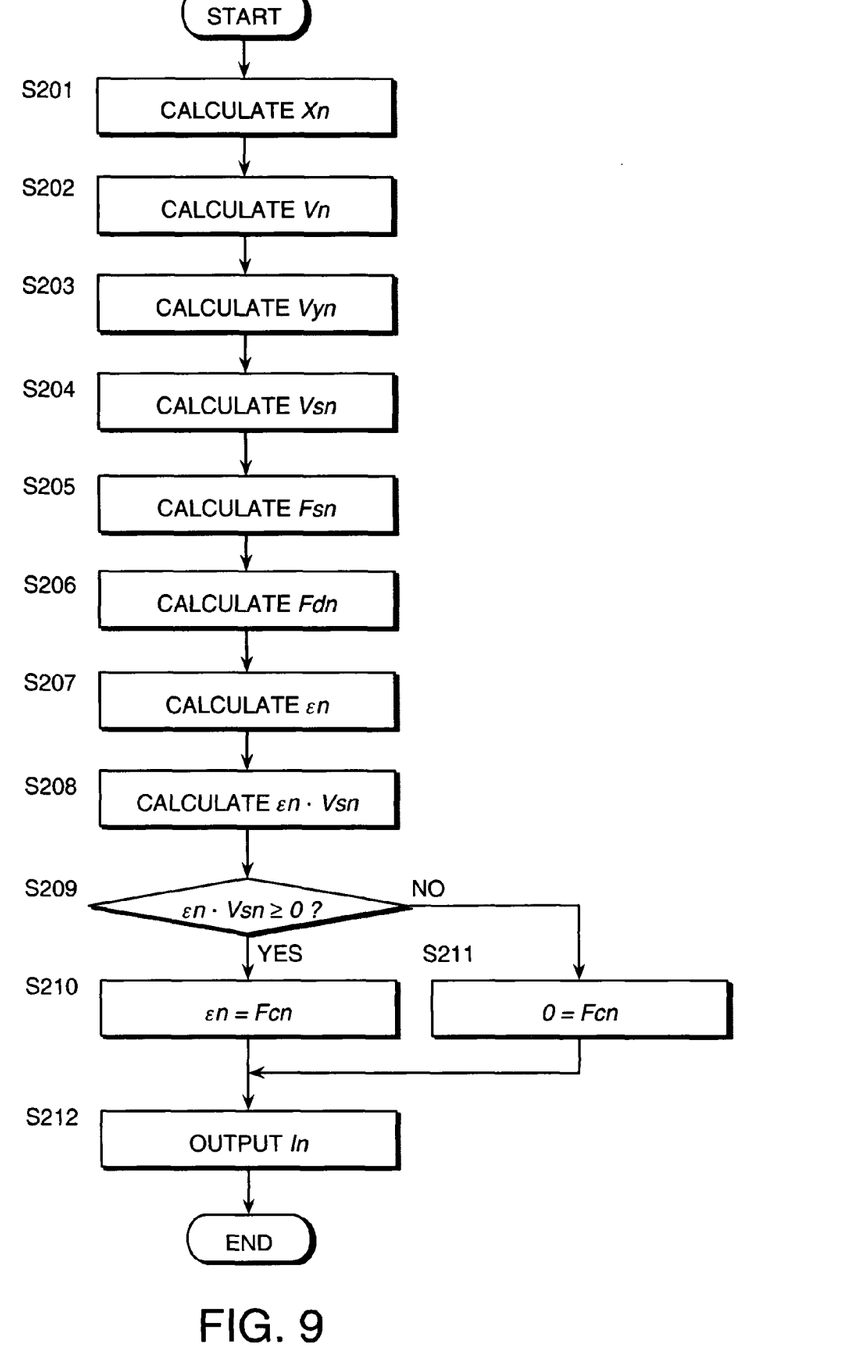
FIG. 9 is a flowchart describing a damping force control routine executed by the control portion.

Referring to FIG. 9, a control routine executed by the control portion 2 when it is constituted by a microcomputer will be described. The control portion 2 executes this routine repeatedly at regular intervals of ten milliseconds, for example, In a step S201, the control portion 2 reads the acceleration α1, α2, α3 detected by the sprung member acceleration sensors G1, G2, G3 and calculates the sprung member acceleration Xn.

In a step S202, the control portion 2 calculates the sprung member speed Vn of the sprung members Bn in a vertical direction from the sprung member acceleration Xn.

In a step S203, the control portion 2 calculates the unsprung member speed Vyn of the unsprung member Wn in a vertical direction from the unsprung member acceleration Yn detected by the unsprung member acceleration sensors GU1-GU4.

In a step S204, the control portion 2 calculates the stroke speed Vsn of the shock absorbers Dn from the unsprung member speed Vyn and the sprung member speed Vn.

In a step S205 the control portion 2 calculates the damping force target value Fsn from the sprung member speed Vsn and the Sky Hook damping coefficient Cs.

In a step S206, the control portion 2 calculates the minimum damping force Fdn on the basis of the stroke speed Vsn.

In a step S207, the control portion 2 calculates the deviation εn by subtracting the minimum damping force Fdn from the damping force target value Fsn.

In a step S208, the control portion 2 calculates the product of the deviation εn and the stroke speed Vsn.

In a step S209, the control portion 2 determines the sign of the product of the deviation εn and the stroke speed Vsn. When the sign is positive, the control portion 2 performs the processing of a step S210. When the sign is negative, the control portion 2 performs the processing of a step S211.

In the step S210, the control portion 2 sets the variable damping force Fcn equal to the deviation εn.

In the step S211, the control portion 2 sets the variable damping force Fcn to zero.

In a step S212, the control portion 2 converts the variable damping force Fcn set in the step S210 or the step S211 into a current command value In and outputs the current command value In to the drive circuit of the solenoid 110.

The control portion 2 executes this routine repeatedly to control the variable damping force of the shock absorber Dn.

Figure 6:
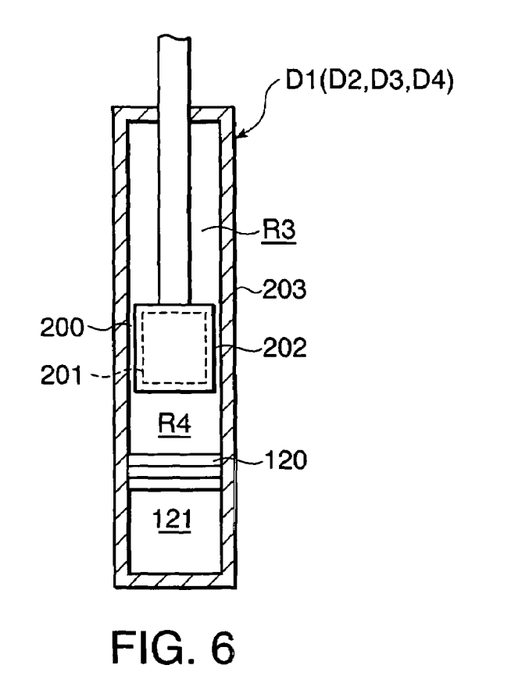
FIG. 6 is a schematic longitudinal sectional view of another shock absorber to which this invention can be applied.

When the shock absorber Dn uses magnetorheological fluid as shown in FIG. 6, the control portion 2 calculates a current command value as a current which the shock absorber Dn requires to generate the damping force corresponding to the damping force target value Fsn, by referring to a map specifying the relationship between the current command value and the damping force target value Fsn. When the shock absorber Dn uses electrorheological fluid, voltage control is performed instead of current control, and hence the current and current command values in the steps of FIG. 9 should be replaced by voltage and voltage command values. damping force target value Fsn. When the shock absorber Dn uses electrorheological fluid, voltage control is performed instead of current control, and hence the current and current command values in the steps of FIG. 9 should be replaced by voltage and voltage command values.

The control portion 2 calculates the voltage command value which the shock absorber Dn requires to generate a damping force corresponding to the damping force target value Fsn as a voltage command value by referring to a map specifying the relationship between the voltage command value and the damping force.

The contents of Tokugan 2006-183493, with a filing date of Jul. 3, 2006 in Japan, are hereby incorporated by reference.

Although the invention has been described above with reference to a certain embodiment of the invention, the invention is not limited to the embodiment described above. Modifications and variations of the embodiment described above will occur to those skilled in the art, within the scope of the claims.

For example, in the above embodiment, the damping force varying mechanism 3 is set to decrease the variable damping force as the energizing electric current increases, but it is still possible to cause the damping force varying mechanism 3 to increase the variable damping force as the energizing electric current increases.

In the above embodiment, the acceleration sensors are used in order to execute Sky Hook control. Physical quantities and state quantities the electrorheological fluid or magnetorheological fluid to vary the damping force. However, the damping force varying mechanism may be constituted by a variable orifice disposed in the shock absorber Dn and a control portion 2 configured to vary the flow cross-sectional area of the variable orifice.

The embodiments of this invention in which an exclusive property or privilege is claimed are defined as follows:

What is claimed is:

1. A damping force control device for controlling a damping force generated by a shock absorber interposed between a sprung member and an unsprung member of a vehicle, comprising:

a damping force varying mechanism which supplements a minimum damping force of the shock absorber that shows a linear characteristics with respect to a stroke speed of the shock absorber with a variable damping force to cause a damping force generated by the shock absorber to have characteristics that are shifted from the characteristics of the minimum damping force with respect to the stroke speed of the shock absorber; and a control portion programmed to:

calculate a deviation between a damping force target value and the minimum damping force; and open-loop control the damping force varying mechanism according to the deviation such that the damping force generated by the shock absorber coincides with the damping force target value.

2. The damping force control device as defined in claim 1, wherein the control portion includes means for calculating the damping force target value by multiplying a sprung member speed of the sprung member in a vertical direction by a Sky Hook damping coefficient, and calculate the minimum damping force on the basis of a stroke speed of the shock absorber.

3. The damping force control device as defined in claim 2, wherein the control portion further includes means for calculating the minimum damping force by referring to a pre-defined map defining the minimum damping force using the stroke speed of the shock absorber as a parameter.

4. The damping force control device as defined in claim 1, wherein the control portion includes means for calculating a product of the deviation and a stroke speed of the shock absorber, and for setting the variable damping force equal to the deviation when the sign of the product is positive while setting the variable damping force to zero when the sign of the product is negative.

5. The damping force control device as defined in claim 1, wherein the damping force varying mechanism comprises a damping valve and a solenoid which varies a cracking pressure of the damping valve according to a supplied electric current, and the control portion includes means for open-loop controlling the supplied electric current to the solenoid according to the deviation.

6. The damping force control device as defined in claim 1, wherein the shock absorber is configured to generate the damping force depending on a viscosity of a magnetorheological fluid enclosed therein, the damping force varying mechanism comprises the viscosity varying mechanism which varies a viscosity of the magnetorheological fluid in the shock absorber according to a supplied electric current, and the control portion includes means for open-loop controlling the electric current supplied to the viscosity varying mechanism according to the deviation.

7. The damping force control device as defined in claim 1, wherein the shock absorber is configured to generate the damping force depending on a viscosity of an electrorheological fluid enclosed therein, the damping force varying mechanism comprises a viscosity varying mechanism which varies the viscosity of the electrorheological fluid in the shock absorber according to a supplied electric current, and the control portion includes means for open-loop controlling the electric current supplied to the viscosity varying mechanism according to the deviation.

8. The damping force control device as defined in claim 1, wherein the damping force varying mechanism is configured to continuously vary the damping force generated by the shock absorber.

9. The damping force control device as defined in claim 1, wherein the damping force characteristic is a non-linear characteristic such that the damping force varies more steeply in a region where the stroke speed is smaller than a predetermined speed than in a region where the stroke speed is greater than the predetermined speed, irrespective of a stroke direction of the shock absorber.

10. A damping force control device for controlling a damping force generated by a shock absorber interposed between a sprung member and an unsprung member of a vehicle, comprising:
    a damping force varying mechanism which supplements a minimum damping force of the shock absorber that shows a linear characteristics with respect to a stroke speed of the shock absorber with a variable damping force to cause a damping force generated by the shock absorber to have characteristics that are shifted from the characteristics of the minimum damping force with respect to the stroke speed of the shock absorber; and
    means for calculating a deviation between a damping force target value and the minimum damping force; and
    means for open-loop controlling the damping force varying mechanism according to the deviation such that the damping force generated by the shock absorber coincides with the damping force target value.

11. A damping force control method for controlling a damping force generated by a shock absorber interposed between a sprung member and an unsprung member of a vehicle, the shock absorber comprising damping force varying mechanism which supplements a minimum damping force of the shock absorber that shows a linear characteristics with respect to a stroke speed of the shock absorber with a variable damping force to cause a damping force generated by the shock absorber to have characteristics that are shifted from the characteristics of the minimum damping force with respect to the stroke speed of the shock absorber, the method comprising:
    calculating a deviation between a damping force target value and the minimum damping force; and
    open-loop controlling the damping force varying mechanism according to the deviation such that the damping force generated by the shock absorber coincides with the damping force target value.

12. The damping force control device as defined in claim 1, wherein the damping force varying mechanism includes a solenoid, and the minimum damping force of the shock absorber is obtained when the solenoid is supplied with a maximum energizing current.

13. The damping force control device as defined in claim 1, wherein:
    the damping force varying mechanism includes a solenoid to which an energizing current is supplied;
    the damping force generated by the shock absorber varies within a range between a minimum damping force characteristic and a maximum damping force characteristic, the minimum damping force characteristic being obtained when the solenoid is supplied with a maximum energizing current, the maximum damping force characteristic being obtained when the solenoid is supplied with no energizing current;
    the damping force generated by the shock absorber is controlled by the solenoid, such that, as the energizing current decreases, a characteristic of the damping force generated by the shock absorber shifts parallel from the minimum damping force characteristic toward the maximum damping force characteristic, wherein a gradient of the characteristic of the damping force generated by the shock absorber remains the same as a gradient of the minimum damping force characteristic.

* * * * *